(12) United States Patent
Ichikawa

(10) Patent No.: US 12,547,497 B2
(45) Date of Patent: Feb. 10, 2026

(54) ABNORMALITY DETECTION DEVICE AND ABNORMALITY DETECTION METHOD

(71) Applicant: Nissan Motor Co., Ltd., Kanagawa (JP)

(72) Inventor: Satoshi Ichikawa, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 18/701,846

(22) PCT Filed: Oct. 19, 2021

(86) PCT No.: PCT/JP2021/038607
§ 371 (c)(1),
(2) Date: Apr. 16, 2024

(87) PCT Pub. No.: WO2023/067689
PCT Pub. Date: Apr. 27, 2023

(65) Prior Publication Data
US 2024/0419553 A1 Dec. 19, 2024

(51) Int. Cl.
*G06F 11/14* (2006.01)
*G06T 7/00* (2017.01)

(52) U.S. Cl.
CPC ........ *G06F 11/1438* (2013.01); *G06T 7/0002* (2013.01); *G06F 2201/805* (2013.01)

(58) Field of Classification Search
CPC .......... G06F 11/1438; G06F 2201/805; G06F 3/147; G06T 7/0002; G09G 2320/103;
(Continued)

(56) References Cited

U.S. PATENT DOCUMENTS

| 2017/0124403 A1 | 5/2017 | Tada et al. |
| 2018/0184080 A1 | 6/2018 | Kaya et al. |

(Continued)

FOREIGN PATENT DOCUMENTS

| JP | 2003-222596 A | 8/2003 |
| JP | 2008-193145 A | 8/2008 |

(Continued)

*Primary Examiner* — Abhishek Sarma
(74) *Attorney, Agent, or Firm* — Osha Bergman Watanabe & Burton LLP

(57) ABSTRACT

An abnormality detection device detects an abnormality of a screen display displayed on a display. The abnormality detection device is configured to monitor screen display data displayed by the display; determine, based on the screen display data and a user operation regarding the screen display performed by a user, whether or not the screen display has transitioned according to the user operation; extract a screen region which is a target of transition by the user operation within the screen display as a target region; and compare the screen display data corresponding to the target region of when the user operation was performed with the screen display data corresponding to the target region of after a lapse of a predetermined period from the user operation, so as to determine whether or not the screen display has transitioned; and when the screen display does not transition within the predetermined period, determine that the screen display is in a freeze state of being unresponsive to the user operation.

10 Claims, 6 Drawing Sheets

(58) Field of Classification Search
CPC ........... G09G 2354/00; G09G 2330/12; G09G 2358/00; G09G 2380/10; H04N 17/04
See application file for complete search history.

(56) References Cited

U.S. PATENT DOCUMENTS

2019/0286115 A1   9/2019  Wang
2023/0237941 A1*  7/2023  Jeong ..................... G09G 5/003
                                                            345/204

FOREIGN PATENT DOCUMENTS

| JP | 2009-073386 A | 4/2009 |
| JP | 2016-074290 A | 5/2016 |
| JP | 2017081445 A | 5/2017 |
| JP | 2018-107588 A | 7/2018 |
| WO | 2018/225210 A1 | 12/2018 |

* cited by examiner

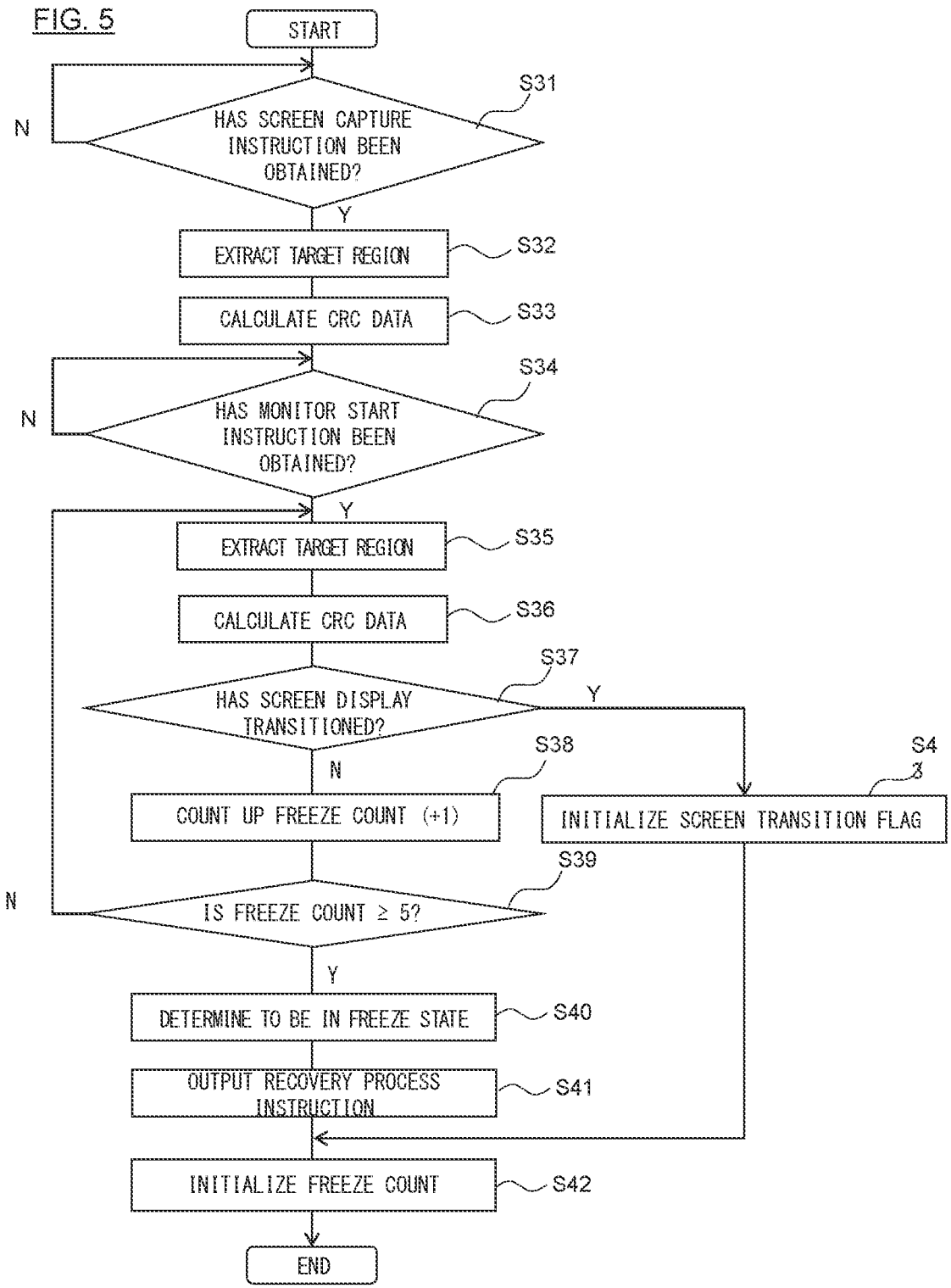

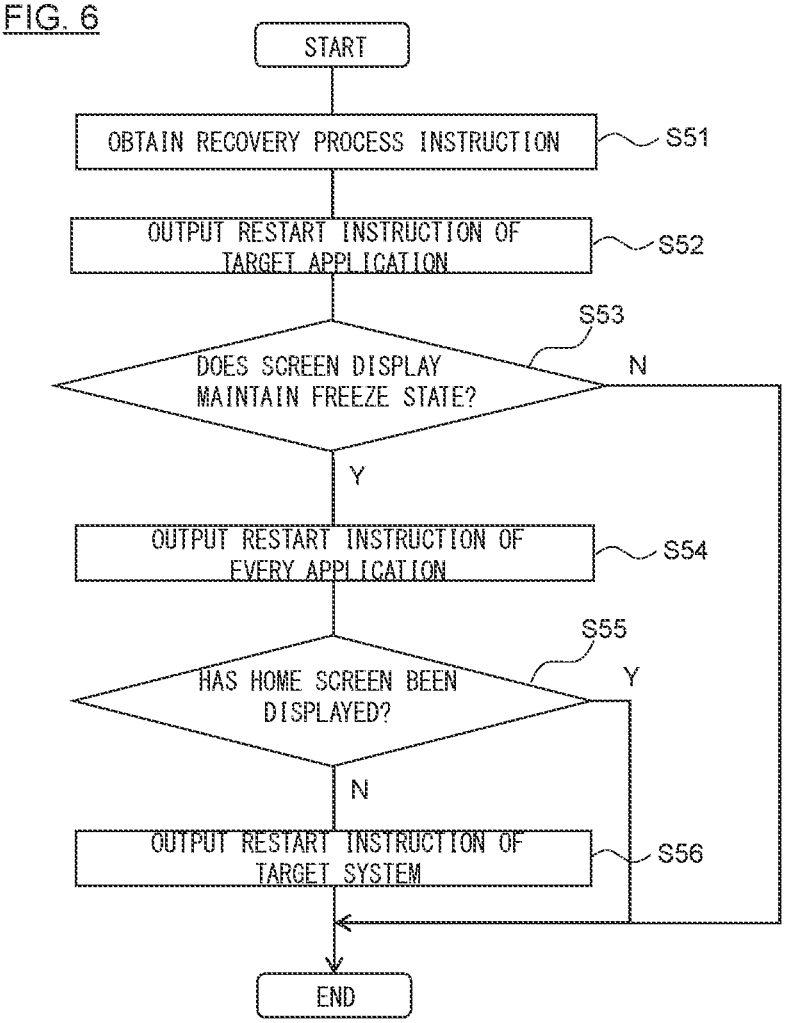

ABNORMALITY DETECTION DEVICE AND ABNORMALITY DETECTION METHOD

TECHNICAL FIELD

The present invention relates to an abnormality detection device and an abnormality detection method for detecting an abnormality of a screen display.

BACKGROUND ART

Conventionally, there has been known an automatic control device using navigation that performs control of a vehicle using road information indicated by a navigation device (Patent Document 1). The navigation device includes a global positioning device (GPS), a storage device which stores map data, a locator having a function of searching for a current position on the map, and a display which performs display of the map or the like. In a locator process executed by a CPU, the map data is read out by the storage device, and information of the latitude and longitude of the current location obtained by the global positioning device is mapped on the map. In addition, in the locator process, heart beat information indicating that the process itself is normally operating is transmitted to a process monitoring process. When this heart beat information does not arrive within a certain period, the process monitoring process recognizes that a failure has occurred.

PRIOR ART DOCUMENT

Patent Document

Patent Document 1: JP-A-2009-73386

SUMMARY OF INVENTION

Problems to be Solved by Invention

The prior art carries a problem that, since the presence/absence of an occurrence of a failure is not determined by monitoring a screen display, a state in which the screen display is unresponsive to an operation of a user, that is, a freeze state of the screen display, is difficult to be detected.

A problem to be solved by the present invention is to provide an abnormality detection device and an abnormality detection method for detecting a freeze state of a screen display.

Means for Solving Problem

The present invention solves the above-described problem by monitoring screen display data displayed on a display, determining, based on the screen display data and an operation of a user regarding the screen display, whether or not the screen display has transitioned according to the operation of the user, and when the screen display does not transition within a predetermined period from the operation of the user, determining that the screen display is in a freeze state of being unresponsive to the operation of the user.

Effects of Invention

According to the present invention, a freeze state of a screen display can be detected.

BRIEF DESCRIPTION OF DRAWINGS

FIG. 5 is an example of a flowchart illustrating a process executed by a screen display data monitoring unit and a screen display freeze detection unit illustrated in FIG. 2.

FIG. 6 is an example of a flowchart illustrating a process executed by a recovery processing unit according to a second embodiment.

MODE(S) FOR CARRYING OUT THE INVENTION

Embodiments of the abnormality detection device and the abnormality detection method according to the present invention will be described below based on the drawings.

First Embodiment

Figure 1:
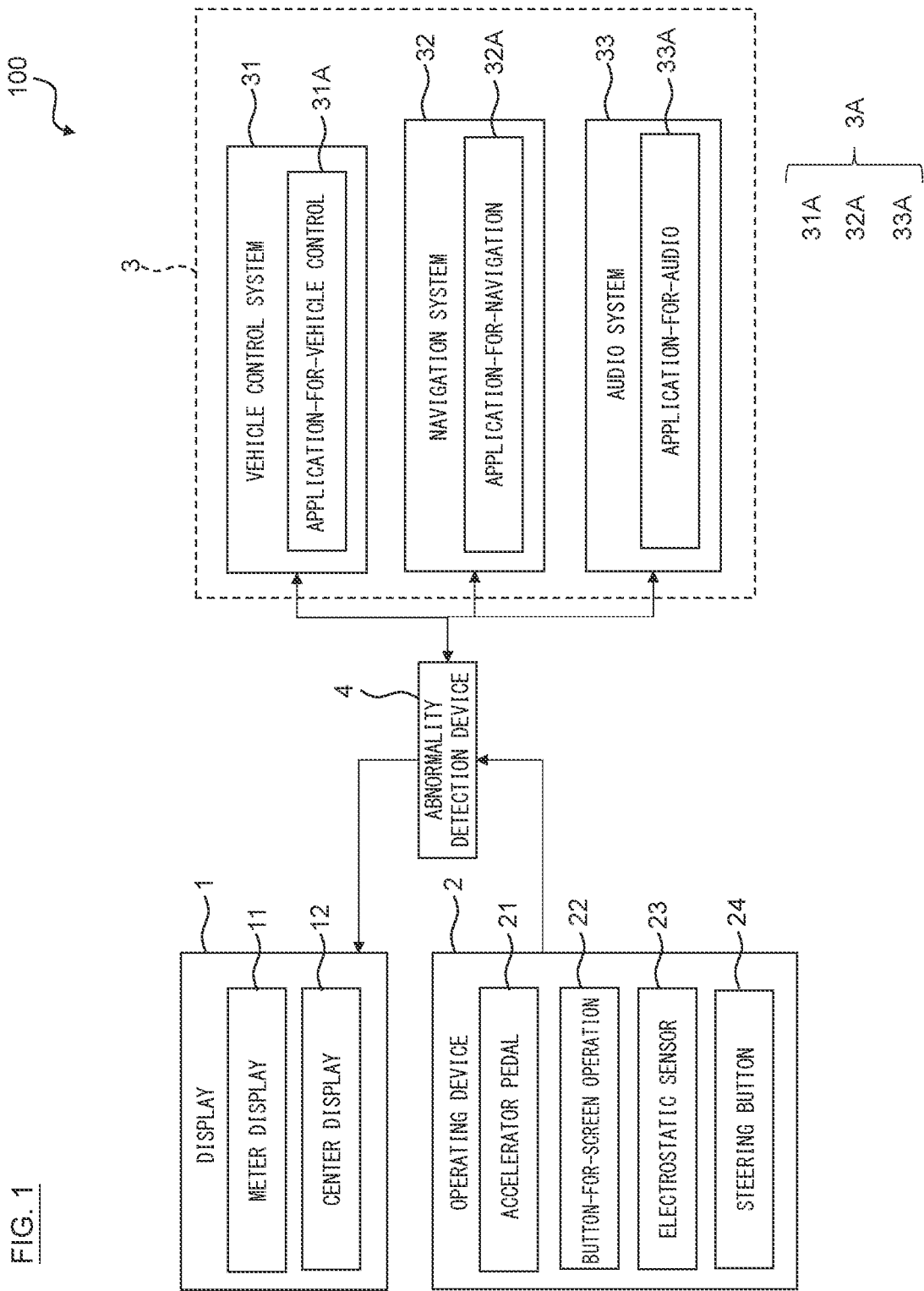
FIG. 1 is a block diagram illustrating an example of a screen display system including an abnormality detection device according to a first embodiment.

As illustrated in FIG. 1, an abnormality detection device 4 according to the present embodiment is achieved as a part of a screen display system 100. FIG. 1 is a block diagram illustrating an example of the screen display system 100 according to the present embodiment. In the present embodiment, the screen display system 100 is a system mounted on a vehicle, and a system that causes a display 1 to display a screen. A passenger of the vehicle can visually perceive the screen displayed on the display 1.

In the screen display system 100, the abnormality detection device 4 according to the present embodiment is positioned at a relay point of the display 1, an operating device 2, and a screen display related system 3. When the passenger operates the operating device 2, the abnormality detection device 4 performs transmission and reception of information with the screen display related system 3 linked to the operation of the passenger. Then, the abnormality detection device 4 outputs screen display data based on information input from the screen display related system 3 on the display 1 and causes the display 1 to display an image corresponding to the operation of the passenger. In addition to the function of causing the display 1 to display a screen, the abnormality detection device 4 has a function of detecting a screen display abnormality. In the present embodiment, the abnormality detection device 4 has a function of detecting what is called a freeze state of the screen display among the screen display abnormalities. The freeze state of the screen display is a state in which the screen display is unresponsive to the operation of the passenger even when the passenger operates the operating device 2. The method for detecting the freeze state of the screen display will be described later. The outline of the screen display system 100 is as described above. Note that, in the present description, the term "application" is synonymous with the term "application software," which means a piece of software designed for a specific usage or object. In addition, in the present description, the term "button" is synonymous with the term "push switch" of performing opening and closing of an operation portion by the operation portion moving in its axis direction according to a push movement performed by a finger of the passenger.

As illustrated in FIG. 1, the screen display system 100 includes the display 1, the operating device 2, the screen display related system 3, and the abnormality detection device 4. Each of the configurations included in the screen display system 100 are mounted on the vehicle, and connected to each other by a vehicle-mounted network, such as a Controller Area Network (CAN) or a Local Interconnect Network (LIN). Each of the configurations illustrated in FIG. 1 are supplied with a voltage based on an output voltage of an on-vehicle battery. For example, in a case of an electric automobile on which an on-vehicle battery for driving is mounted, each of the configurations illustrated in FIG. 1 are supplied with a voltage (such as 12V) that is the output voltage (such as several hundred V) of the on-vehicle battery for driving being stepped down by a DC-DC converter. Note that the drive source of the vehicle on which the screen display system 100 is to be mounted is not particularly limited, and the screen display system 100 may be mounted on a hybrid automobile or a gasoline automobile, besides an electric automobile. Each of the configurations illustrated in FIG. 1 may be supplied with a voltage of an on-vehicle battery for the system, which has a voltage lower than that of the on-vehicle battery for driving.

The display 1 is a device which displays an image based on the screen display data input from the abnormality detection device 4. In the present embodiment, when the passenger operates the operating device 2 described later, a part or the entirety of the screen display of the display 1 switches according to operation content of the passenger by various applications included in the screen display related system 3. While FIG. 1 illustrates one display 1, the number of the displays 1 is not particularly limited, and the screen display system 100 may include a plurality of the displays 1.

Examples of the display 1 include a meter display 11 and a center display 12 provided on an instrument panel. The meter display 11 is provided in front of a driver's seat, and displays information corresponding to an accelerator operation or a brake operation by the driver, such as a speedometer indicating a vehicle speed and a tachometer indicating an engine rotation speed. The center display 12 is provided on an approximate center of the instrument panel, and displays information corresponding to the screen operation by the passenger, such as a navigation screen and an audio screen.

The operating device 2 is a device which allows the passenger to perform an operation regarding the screen display of the display 1. In the present embodiment, the operation regarding the screen display includes at least an operation that causes a part or the entirety of the screen display of the display 1 to change. While FIG. 1 illustrates one operating device 2, the number of the operating devices 2 is not particularly limited, and the screen display system 100 may include a plurality of the operating devices 2. In addition, the screen display of the display 1 may have a configuration that can be changed from a plurality of the operating devices 2. Moreover, the operating device 2 may have a configuration that can change the screen displays of a plurality of the displays 1. Furthermore, the shape, size, material, or the like of the operating device 2 is not particularly limited.

An example of the operating device 2 that can change the screen display of the meter display 11 is an accelerator pedal 21. For example, when the driver steps on the accelerator pedal 21, a display of the speedometer according to the accelerator operation is read out by an application-for-vehicle control 31A described later. The meter display 11 displays a different vehicle speed due to the driver having operated the accelerator pedal 21.

In addition, examples of the operating device 2 that can change the screen display of the center display 12 include a button-for-screen operation 22, an electrostatic sensor 23, and a steering button 24. Specific examples of the button-for-screen operation 22 include a current location button on which the characters of "current location" are printed and a menu button on which the characters of "menu" are printed, which are provided around the center display 12. For example, when the passenger presses the menu button in a state in which an audio screen is displayed on the center display 12, the menu screen is read out by an application-for-navigation 32A described later. The screen display of the center display 12 is switched from the audio screen to the menu screen due to the passenger having operated the button-for-screen operation 22.

The operating device 2 may have a configuration provided integrally with the display 1. When the display 1 is constituted of a touch panel-type display, the electrostatic sensor 23 provided in the touch panel-type display functions as the operating device 2. For example, when the passenger touches an icon displayed as "AUDIO" in the menu screen in a state in which the menu screen is displayed on the center display 12, the audio screen is read out by an application-for-audio 33A described later. The screen display of the center display 12 switches from the menu screen to the audio screen due to the touch operation of the passenger having been detected by the electrostatic sensor 23.

A specific example of the steering button 24 is a source button that is provided on a steering and is capable of changing the source of the audio. For example, when the driver presses the source button in a state in which the audio screen is displayed on the center display 12, a display (such as displays of "AM" and "FM" indicating the radio) indicating the source of the audio is read out by the application-for-audio 33A. In the screen display of the center display 12, the source display of the audio is changed due to the driver operating the steering button 24.

When the passenger operates the operating device 2, operation data corresponding to the operation of the passenger is output from the operating device 2 to the abnormality detection device 4. The operation data includes at least the operation content of the passenger regarding the operating device 2 and the type of the operating device 2 that has been operated. An example of the data indicating the operation content of the passenger is an input/output port value (also referred to as an input/output port address) of the operating device 2. In addition, an example of the data indicating the type of the operating device 2 is a type identifier (ID) attached in advance to each of the accelerator pedal 21, the button-for-screen operation 22, the electrostatic sensor 23, and the steering button 24. Note that, while the present embodiment is described by giving an example of the passenger of the vehicle as the user operating the operating device 2, the subject that operates the operating device 2 is not limited to the passenger of the vehicle, and may be a user other than the passenger of the vehicle.

The screen display related system 3 is a system regarding the screen display of the display 1, and includes at least an application (hereinafter, referred to as a screen display related application 3A) linked to the operation of the passenger regarding the operating device 2. The screen display related system 3 may include an application that is not related to the screen display of the display 1 besides the screen display related application 3A. An instruction (hereinafter, referred to as the screen transition instruction) to change a part or the entirety of the screen display of the display 1 is input from the abnormality detection device 4 to the screen display related system 3. Based on the screen transition instruction, the screen display related application 3A generates an image corresponding to the operation of the passenger. The screen display related system 3 outputs screen structure information generated by the screen display related application 3A to the abnormality detection device 4. Examples of the screen display related system 3 include a vehicle control system 31, a navigation system 32, and an audio system 33.

The vehicle control system 31 is a system for controlling the travelling of the vehicle, and includes the application-for-vehicle control 31A as an application regarding the screen display of the meter display 11. When the screen transition instruction is input from the abnormality detection device 4, the application-for-vehicle control 31A generates an image of vehicle speed display corresponding to the operation amount of the driver. The vehicle control system 31 outputs the screen structure information generated by the application-for-vehicle control 31A to the abnormality detection device 4.

The navigation system 32 is a system for offering route guidance to the passenger, and includes the application-for-navigation 32A as an application regarding the screen display of the center display 12. When the screen transition instruction is input from the abnormality detection device 4, the navigation system 32 generates an image corresponding to the operation content of the passenger. The navigation system 32 outputs the screen structure information generated by the application-for-navigation 32A to the abnormality detection device 4.

The audio system 33 is a system for outputting sounds, such as music, and includes the application-for-audio 33A as an application regarding the screen display of the center display 12. When the screen transition instruction is input from the abnormality detection device 4, the application-for-audio 33A generates an image (such as the audio screen itself or a display of the audio source) corresponding to the operation content of the passenger. The audio system 33 outputs the screen structure information generated by the application-for-audio 33A to the abnormality detection device 4.

The abnormality detection device 4 is constituted of a computer including a piece of hardware and a piece of software, and is constituted of a Read Only Memory (ROM) that stores a program, a Central Processing Unit (CPU) that executes the program stored in this ROM, and a Random Access Memory (RAM) that functions as an accessible storage device. As an operation circuit, a Micro Processing Unit (MPU), a Digital Signal processor (DSP), an Application Specific Integrated Circuit (ASIC), a Field Programmable Gate Array (FPGA), or the like can be used instead of or together with the CPU. While the present embodiment is described by giving an example of a configuration in which the program is stored in advance in the ROM, the place in which the program is to be stored is not limited to the inside of the abnormality detection device 4. For example, the program may be readable by a computer and be stored in a portable recording medium (such as a disk medium or a flash memory) that is readable by a computer. In this case, the abnormality detection device 4 executes the program downloaded by the recording medium that is readable by the computer. In other words, the abnormality detection device 4 may include only the operation circuit, and be configured to download the program from outside.

Figure 2:
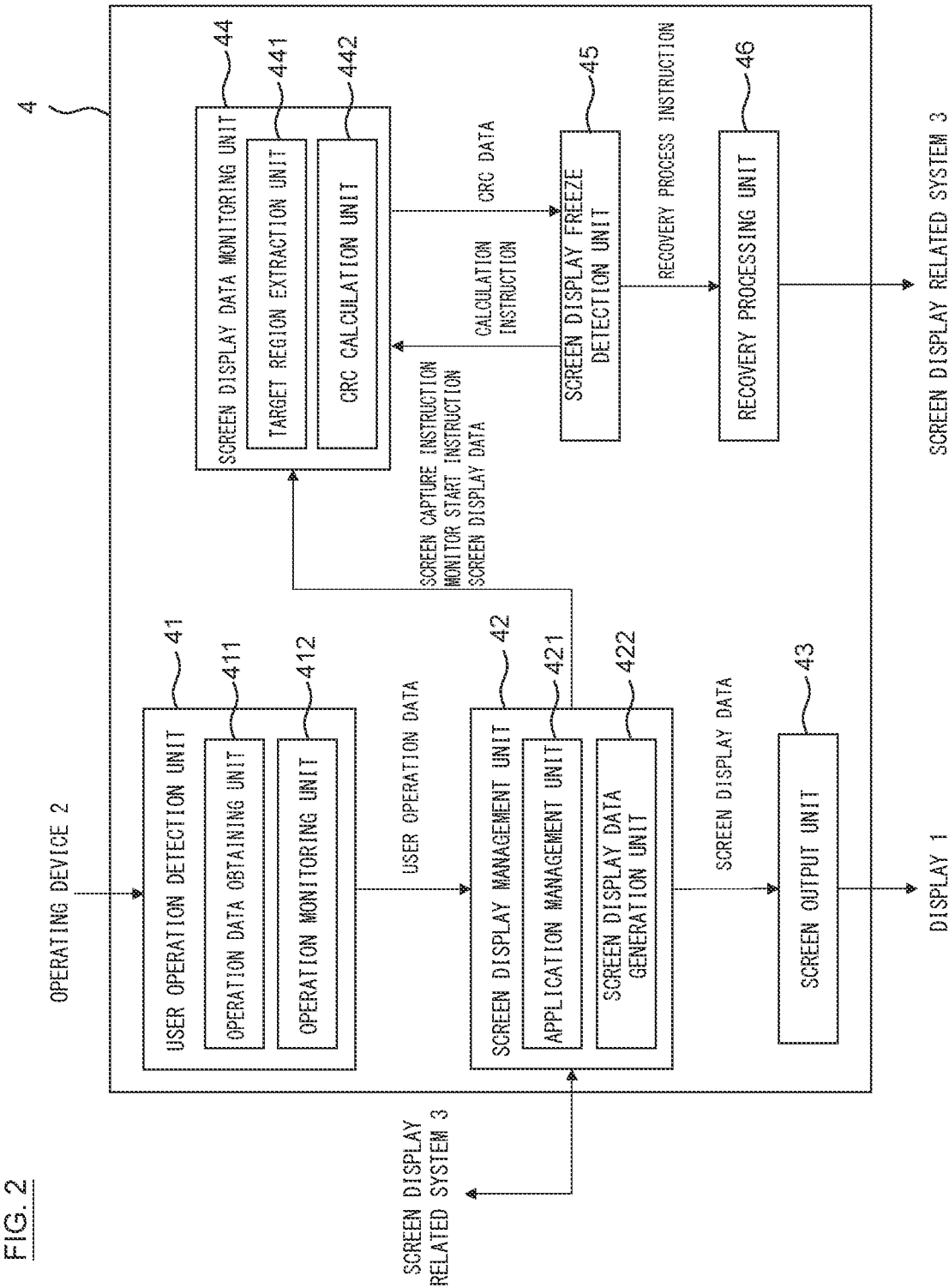
FIG. 2 is a diagram for describing a function of the abnormality detection device illustrated in FIG. 1.

Next, the function of the abnormality detection device 4 illustrated in FIG. 1 will be described using FIG. 2 to FIG. 5. FIG. 2 is a drawing for describing a function of the abnormality detection device 4 illustrated in FIG. 1. As illustrated in FIG. 2, the abnormality detection device 4 includes a user operation detection unit 41, a screen display management unit 42, a screen output unit 43, a screen display data monitoring unit 44, a screen display freeze detection unit 45, and a recovery processing unit 46. These blocks achieve the respective functions described later by a piece of software established by the ROM. In addition, these blocks are included in a "controller," which is the subject that executes the abnormality detection method according to the present invention. Note that, while the function provided to the abnormality detection device 4 in the present embodiment is divided into six function blocks and described as the functions of the respective function blocks, the function of the abnormality detection device 4 need not necessarily be divided into six blocks, and may be divided into five or less function blocks or seven or more function blocks.

The function of the user operation detection unit 41 will be described. When the operating device 2 is operated by the passenger, the user operation detection unit 41 detects the operation of the passenger. As illustrated in FIG. 2, the user operation detection unit 41 includes an operation data obtaining unit 411 and an operation monitoring unit 412. The operation data obtaining unit 411 obtains at least operation data including the type of the operating device 2 operated by the passenger and the operation content of the passenger from the operating device 2. The operation monitoring unit 412 identifies the operation content of the passenger with the obtainment of the operation data used as a trigger. The operation monitoring unit 412 outputs user operation data including the operation content of the passenger to the screen display management unit 42.

Figure 3:
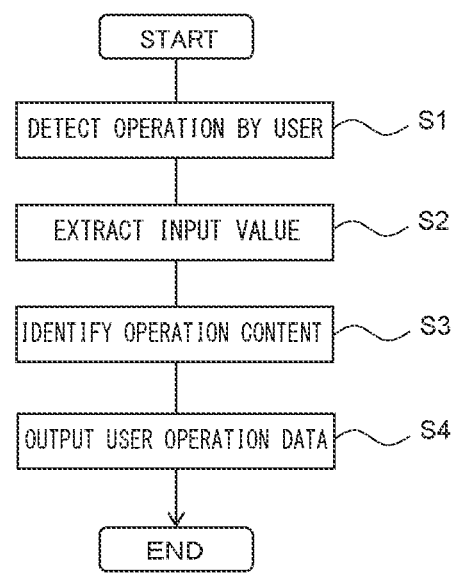
FIG. 3 is an example of a flowchart illustrating a process executed by a user operation detection unit illustrated in FIG. 2.

FIG. 3 is an example of a flowchart illustrating a process executed by the user operation detection unit 41. In Step S1, the user operation detection unit 41 obtains the operation data from the operating device 2, and thereby detects the passenger having operated the operating device 2. In Step S2, the user operation detection unit 41 extracts an input value (input/output port value) corresponding to the operation content of the passenger from the operation data obtained in Step S1. In addition, in this step, the user operation detection unit 41 identifies the type of the operating device 2 from the operation data. For example, the user operation detection unit 41 identifies the target operated by the passenger by referring to an identifier indicating the type of the operating device 2 included in the operation data.

In Step S3, the user operation detection unit 41 identifies the operation content of the passenger from the input value extracted in Step S2. For example, when a map indicating a corresponding relationship between an input value and operation content for each type of the operating device 2 is stored in advance, the user operation detection unit 41 reads out the map for the type of the operating device 2 identified in Step S2, and identifies the operation content of the passenger corresponding to the input value (input/output port value).

In Step S4, the user operation detection unit 41 outputs user operation data including the operation content of the passenger identified in Step S3 to the screen display management unit 42 illustrated in FIG. 2. When the process of Step S4 ends, the user operation detection unit 41 ends the process of the flowchart illustrated in FIG. 3.

With reference to FIG. 2 again, the function of the screen display management unit 42 will be described. The screen display management unit 42 performs transmission and reception of information with the screen display related application 3A, and manages the state of the screen display of the display 1. As illustrated in FIG. 2, the screen display management unit 42 includes an application management unit 421 and a screen display data generation unit 422. The application management unit 421 identifies the screen display related application 3A linked to the operation of the passenger regarding the operating device 2 as a target application. In addition, the application management unit 421 identifies the screen display related system 3 including the target application as the target system. The application management unit 421 outputs the operation content (user operation data) of the passenger to the target system, and causes the target system to execute the target application. In addition, the user operation data is input to the application management unit 421 from the user operation detection unit 41. Based on the user operation data, the application management unit 421 determines whether or not to cause the screen of the display 1 to transition in response to the passenger having operated the operating device 2. An example of the determination result of whether or not to cause the screen display of the display 1 to transition is a context ID. For example, when the driver has operated the accelerator pedal 21, the application management unit 421 determines the need to change the vehicle speed display of the speedometer, that is, whether or not to cause the screen display of the meter display 11 to transition. In addition, for example, when the passenger has operated the button-for-screen operation 22, or when a touch operation of the passenger has been detected by the electrostatic sensor 23, the application management unit 421 determines the need to change the navigation screen (such as a current location display screen or a map display screen), that is, whether or not to cause the screen display of the center display 12 to transition. In addition, for example, when the passenger has operated the button-for-screen operation 22, when a touch operation of the passenger has been detected by the electrostatic sensor 23, or when the driver has operated the steering button 24, the application management unit 421 determines the need to change the audio screen, that is, whether or not to cause the screen display of the center display 12 to transition. When the determination result indicates that the screen display is required to be transitioned, the application management unit 421 outputs a screen capture instruction to the screen display data monitoring unit 44. The screen capture instruction is an instruction for obtaining and retaining the screen display data displayed on the display 1 at the point when the passenger operated the operating device 2. In addition, after outputting the screen capture instruction, the application management unit 421 outputs the screen transition instruction to the target system.

As a response to the screen transition instruction, the screen structure information is input from the target system to the screen display data generation unit 422. Based on the input screen structure information, the screen display data generation unit 422 generates screen display data to be displayed on the display 1. An example of the screen display data is an RGB value. The screen display data generation unit 422 generates screen display data corresponding to the operation of the passenger regarding the operating device 2.

In addition, when the screen display of the center display 12 is constituted of a plurality of images, the screen display data generation unit 422 may perform a combining process of the plurality of images to generate screen display data for displaying the entire screen of the center display 12. For example, it is assumed that the screen display of the center display 12 was constituted of "Image A," "Image B," and "Image C" in descending order. Image A and Image C are images that are fixed regardless of the operation of the passenger, and Image B is an image that changes according to the operation of the passenger. In the case of this example, the screen display data generation unit 422 generates screen display data corresponding to Image B based on the screen structure information from the target system. Then, the screen display data generation unit 422 executes a process of combining screen display data corresponding to Image A and Image C with the generated screen display data corresponding to Image B, and generates screen display data corresponding to the entire screen display of the center display 12.

The screen display data generation unit 422 outputs the generated screen display data to the screen output unit 43, and also stores the screen display data in a buffer-for-screen display. In addition, the screen display data generation unit 422 outputs the generated screen display data and a monitor start instruction to the screen display data monitoring unit 44.

Figure 4:
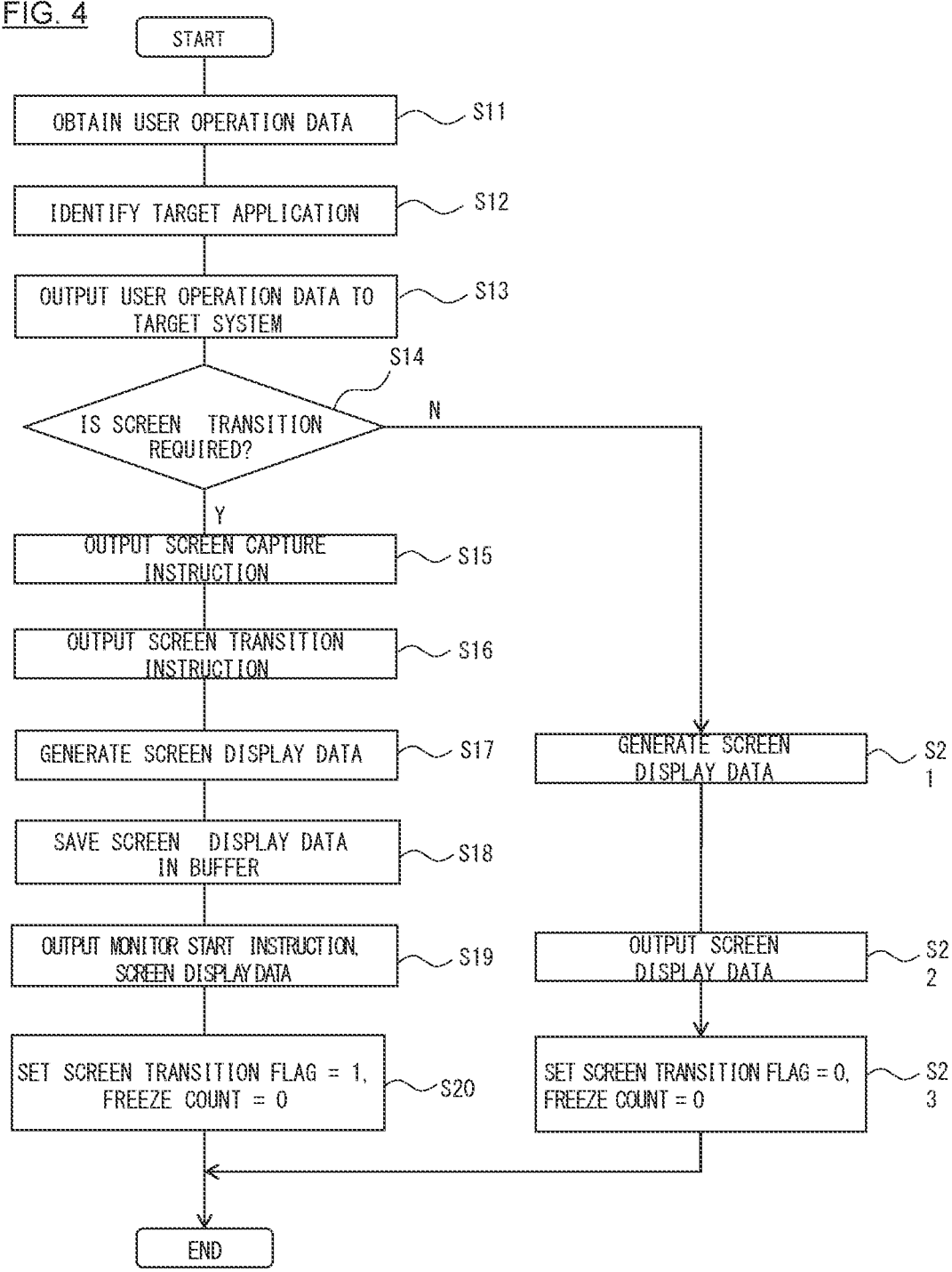
FIG. 4 is an example of a flowchart illustrating a process executed by a screen display management unit illustrated in FIG. 2.

FIG. 4 is an example of a flowchart illustrating a process executed by the screen display management unit 42. In Step S11, the screen display management unit 42 obtains the user operation data output from the user operation detection unit 41 in Step S4 illustrated in FIG. 3. In Step S12, the screen display management unit 42 identifies the screen display related application 3A linked to the operation of the passenger as the target application based on the user operation data obtained in Step S11. In addition, in this step, the screen display management unit 42 identifies the screen display related system 3 including the identified target application as the target system. In Step S13, the screen display management unit 42 outputs the user operation data including the operation content of the passenger to the target system identified in Step S12.

In Step S14, the screen display management unit 42 determines whether or not to cause the screen of the display 1 to transition based on the user operation data obtained in Step S11. When the determination result indicates that the screen transition of the display 1 is required, the process proceeds to Step S15, and when the determination result indicates that the screen transition of the display 1 is unrequired, the process proceeds to Step S21.

In Step S15, the screen display management unit 42 outputs the screen capture instruction to the screen display data monitoring unit 44 illustrated in FIG. 2. In Step S16, the screen display management unit 42 outputs the screen transition instruction to the target system identified in Step S12. In Step S17, the screen display management unit 42 stands by until there is an input from the target system, which is an output destination in Step S16. When the screen structure information is input from the target system, the screen display management unit 42 generates screen display data in which the screen structure information is reflected. In Step S18, the screen display management unit 42 saves the screen display data generated in Step S17 in the buffer-for-screen display.

In Step S19, the screen display management unit 42 outputs the monitor start instruction to the screen display data monitoring unit 44 illustrated in FIG. 2. The monitor start instruction is an instruction indicating the start of the determination process of determining whether or not the screen display transitions according to the screen display data generated in Step S17. In addition, the screen display management unit 42 outputs the screen display data generated in Step S17 to the screen output unit 43 illustrated in FIG. 2.

In Step S20, in order to retain the determination result in Step S14, the screen display management unit 42 sets a screen transition flag to "1," and a freeze count described later to "0." The screen transition flag is a flag indicating whether or not the screen transition of the display 1 is required by the operation of the passenger regarding the operating device 2, and when it is set to "1," it is indicated that the screen transition is required, and when it is set to "0," it is indicated that the screen transition is unrequired. The freeze count will be described later. When the process of the Step S20 ends, the screen display management unit 42 ends the process of the flowchart illustrated in FIG. 4.

When a negative determination is made in Step S14, the process proceeds to Step S21. In Step S21, since the screen transition is not required, the screen display management unit 42 saves the previously generated image display data (image display data that is currently displayed) as the image display data to the buffer. This step is a process equivalent to Step S17 and Step S18. In Step S22, the screen display management unit 42 outputs the screen display data saved in the buffer in Step S21 to the screen output unit 43 illustrated in FIG. 2. In Step S23, in order to retain the determination result in Step S14, the screen display management unit 42 sets the screen transition flag to "0," and the freeze count to "0." When the process of Step S23 ends, the screen display management unit 42 ends the process of the flowchart illustrated in FIG. 4.

With reference to FIG. 2 again, the function of the screen output unit 43 will be described. When the screen display data is input from the screen display management unit 42, the screen output unit 43 outputs the input screen display data to the display 1.

Next, the functions of the screen display data monitoring unit 44 and the screen display freeze detection unit 45 will be described. When the operating device 2 is operated by the passenger and the screen structure information is generated by the screen display related application 3A (target application) linked to the operation of the passenger, the screen display data monitoring unit 44 performs monitoring of the screen display data based on the screen structure information. As illustrated in FIG. 2, the screen display data monitoring unit 44 includes a target region extraction unit 441 and a CRC calculation unit 442.

The target region extraction unit 441 extracts a screen region (also referred to as a target region of a freeze determination), which is determined whether or not to be in the freeze state by the screen display freeze detection unit 45 described later, within the screen display of the display 1 as the target region. The target region is a screen region which is a target of transition according to the operation of the passenger regarding the operating device 2. The target region need only be a region which is smaller than the region of the entire screen display of the display 1, and the size of the target region or the shape of the target region is not particularly limited. The CRC calculation unit 442 described later executes the CRC calculation process on the screen display data of the target region, and therefore the target region is also a target region of calculation by the CRC calculation unit 442. In addition, the screen display freeze detection unit 45 described later uses CRC data of the target region as the determination target in order to determine whether or not the screen display of the display 1 is in the freeze state.

The target region extraction unit 441 may extract the target region in phases from the screen display of the display 1. For example, the target region extraction unit 441 identifies a screen region in which the display content has not changed regardless of the operation of the passenger from the screen display data corresponding to the entire screen display of the display 1, and excludes the screen display data corresponding to the identified screen region from the screen display data corresponding to the entire screen display of the display 1. Next, the target region extraction unit 441 extracts the screen display data corresponding to a further partial region as the screen display from the excluded screen display data. Note that the above-described extraction method of the target region is an example, and the extraction method of the target region is not limited thereto.

The CRC calculation unit 442 calculates a Cyclic Redundancy Check (CRC) code (also referred to as CRC data) of the screen display data corresponding to the target region by using a compressed library. The CRC calculation unit 442 outputs the calculated CRC data to the screen display freeze detection unit 45. Note that the calculation method of the CRC data may be other than the method of using the compressed library, and a calculation method of the CRC data known at the filing of the subject application can be applied to the CRC calculation unit 442.

The function of the screen display freeze detection unit 45 will be described. Based on the screen display data and the operation regarding the screen display performed by the passenger, the screen display freeze detection unit 45 determines whether or not the screen display of the display 1 has transitioned according to the operation of the passenger. When the screen display of the display 1 does not transition within a predetermined period from the point when the passenger operated the operating device 2, the screen display freeze detection unit 45 determines that the screen display of the display 1 is in the freeze state of being unresponsive to the operation of the passenger. An example of the predetermined period is a period in the unit of seconds (such as five seconds), but the time period by which to determine that the screen display is in the freeze state is not limited to five seconds. The predetermined period may be four seconds or less, or six seconds or more.

In addition, when a capture instruction is input from the screen display management unit 42 to the screen display data monitoring unit 44, the screen display freeze detection unit 45 starts the determination of whether or not the screen display has transitioned. Specifically, when the capture instruction is input to the screen display data monitoring unit 44, the screen display freeze detection unit 45 causes the screen display data monitoring unit 44 to execute the CRC data calculation process on the screen display data that was displayed by the display 1 when the passenger operated the operating device 2. In addition, when the monitor start instruction is input to the screen display data monitoring unit 44, the screen display freeze detection unit 45 outputs the screen display data saved in the buffer-for-screen display by the screen display management unit 42 to the screen display data monitoring unit 44. Then, the screen display freeze detection unit 45 causes the screen display data monitoring unit 44 to execute the CRC data calculation process on the output screen display data. The screen display data saved in the buffer-for-screen display is the screen display data output to the display 1 by the screen output unit 43, and therefore the CRC calculation unit 442 executes the CRC data calculation process on the screen display data displayed by the display 1 after the passenger operated the operating device 2.

The screen display freeze detection unit 45 compares the screen display data of when the passenger operated the operating device 2 with the screen display data of after the lapse of a predetermined period, and thereby determines whether or not the screen display of the display 1 has transitioned. In the present embodiment, the screen display freeze detection unit 45 compares the screen display data corresponding to the target region of when the passenger operated the operating device 2 with the screen display data corresponding to the target region of after the lapse of a predetermined period, and thereby determines whether or not the screen display has transitioned. Specifically, in the present embodiment, the screen display freeze detection unit 45 compares the CRC data of the target region of when the passenger operated the operating device 2 with the CRC data of the target region of after the lapse of a predetermined period, and thereby determines whether or not the screen display has transitioned. When a match of the CRC data is obtained as a comparison result, the screen display freeze detection unit 45 determines that the screen display of the display 1 has not transitioned, and when a mismatch of the CRC is obtained as the comparison result, the screen display freeze detection unit 45 determines that the screen display of the display 1 has transitioned. The screen display freeze detection unit 45 outputs the determination result of whether or not the screen display of the display 1 has transitioned to the recovery processing unit 46.

FIG. 5 is an example of a flowchart illustrating a process executed by the screen display data monitoring unit 44 and the screen display freeze detection unit 45. In Step S31, the screen display data monitoring unit 44 determines whether or not the screen capture instruction has been obtained from the screen display management unit 42. The screen capture instruction output from the screen display management unit 42 is the screen capture instruction output in Step S15 of FIG. 4. When a positive determination is made, the process proceeds to Step S32. On the other hand, when a negative determination is made, the screen display data monitoring unit 44 stands by in Step S31 until the positive determination is made.

When the positive determination is made in Step S31, the process proceeds to Step S32, and the screen display freeze detection unit 45 starts the determination process of whether or not the screen display of the display 1 has transitioned. In Step S32, the screen display freeze detection unit 45 outputs the screen display data displayed by the display 1 and a calculation instruction, and causes the screen display data monitoring unit 44 to execute the extraction process of the target region. The screen display data monitoring unit 44 extracts the screen region which is a target by which it is determined whether or not the screen display of the display 1 is in the freeze state within the screen display of the display 1 as the target region. For example, the screen display data monitoring unit 44 extracts the screen display data corresponding to the target region from the screen display data corresponding to the entire screen display of the display 1.

In Step S33, the screen display data monitoring unit 44 calculates the CRC data of the screen display data extracted in Step S32. When the process of Step S33 ends, the CRC data calculated by the screen display data monitoring unit 44 is temporarily saved in a storage device, such as the RAM, as a base for comparison in a determination process in Step S36 described later. In Step S34, the screen display data monitoring unit 44 determines whether or not a monitor start instruction has been obtained from the screen display management unit 42. The monitor start instruction output from the screen display management unit 42 is the monitor start instruction output in Step S19 of FIG. 4. When a positive determination is made, the process proceeds to Step S35. On the other hand, when a negative determination is made, the screen display data monitoring unit 44 stands by in Step S34 until the positive determination is made.

When a positive determination is made in Step S34, the process proceeds to Step S35. In Step S35, the screen display freeze detection unit 45 outputs the calculation instruction, and causes the screen display data monitoring unit 44 to execute the extraction process of the target region. The screen display data monitoring unit 44 executes the extraction process of the target region on the screen display data saved in the buffer-for-screen display in Step S18 of FIG. 4. In addition, the screen display data monitoring unit 44 extracts the screen region which is a target by which it is determined whether or not the screen display of the display 1 is in the freeze state within the screen display of the display 1 as the target region together with the target region extracted in Step S32. The target region extracted in Step S32 and the target region extracted in Step S35 share the same location on the screen display of the display 1, and have screen regions of the same size and shape. In Step S36, the screen display data monitoring unit 44 calculates the CRC data of the screen display data extracted in Step S35.

In Step S37, the screen display freeze detection unit 45 compares the CRC data calculated in Step S33 with the CRC data calculated in Step S36, and thereby determines whether or not the screen display of the display 1 has transitioned. When a comparison result indicating a match of the CRC data is obtained, the screen display is determined not to transition, and the process proceeds to Step S38. On the other hand, when a comparison result indicating a mismatch of the CRC data is obtained, the screen display is determined to have transitioned, and the process proceeds to Step S43.

In Step S37, when the screen display is determined not to transition, the process proceeds to Step S38. In Step S38, the screen display freeze detection unit 45 causes the freeze count to be counted up. In Step S39, the screen display freeze detection unit 45 determines whether or not the freeze count is five counts or more. When the freeze count is less than five counts, the process returns to Step S35, and the target region extraction process by the screen display data monitoring unit 44 is executed again. Subsequently, in Step S36, the CRC data calculation process by the screen display data monitoring unit 44 is executed. Then, in Step S37, the determination process by the screen display freeze detection unit 45 is executed again, and when the screen display does not transition, the process proceeds to Step S38, and the freeze count is counted up. The screen display data monitoring unit 44 and the screen display freeze detection unit 45 execute Step S35 to Step S39 within one second, which allows the screen display of the display 1 to be monitored on a second-by-second basis.

In Step S39, when the freeze count is determined to be five counts or more, that is, when the screen display of the display 1 is not determined to have transitioned at least from the point when the passenger operated the operating device 2 to after the lapse of five seconds, the process proceeds to Step S40.

In Step S40, the screen display freeze detection unit 45 determines that the screen display of the display 1 is in the freeze state, in which the screen display of the display 1 is in a state of being unresponsive to the operation on the operating device 2 by the passenger. In Step S41, in order to solve the freeze state of the screen display, the screen display freeze detection unit 45 outputs a recovery process instruction to the recovery processing unit 46 illustrated in FIG. 2.

In Step S42, the screen display freeze detection unit 45 initializes the freeze count counted up in the process of Step S38. When the process of Step S41 ends, the screen display data monitoring unit 44 and the screen display freeze detection unit 45 end the process of the flowchart illustrated in FIG. 5.

In Step S37, when the screen display is determined to have transitioned, the process proceeds to Step S43. In Step S43, the screen display freeze detection unit 45 initializes the screen transition flag that has been set to "1" in Step S20 in FIG. 4. In Step S42, the screen display freeze detection unit 45 initializes the freeze count. Note that, when the process undergoes Step S43 and reaches Step S42, the screen display freeze detection unit 45 may output the determination result (determination result indicating that the screen display has transitioned) in Step S37 to the recovery processing unit 46 illustrated in FIG. 2. In addition, in Step S43, the screen display freeze detection unit 45 may determine that the screen display of the display 1 has responded to the operation of the passenger and therefore determine that the screen display of the display 1 is not in the freeze state. Furthermore, in the example of FIG. 5, the extraction process of the target region is performed in Step S32 and Step S35, but it may be a flowchart in which the process of Step S35 is omitted, and the CRC data is calculated in Step S36 using the extraction result of Step S32.

With reference to FIG. 2 again, the function of the recovery processing unit 46 will be described. When the recovery process instruction is input from the screen display freeze detection unit 45, the recovery processing unit 46 outputs a restart instruction to restart the target application identified by the application management unit 421 to the target system. Restart of the application means that the running application ends and then the application restarts again. In the target system, by restarting the target application that is assumed to be the cause of the freeze state of the screen display, a recover process for solving the freeze state of the screen display is executed.

As described above, the abnormality detection device 4 according to the present embodiment is a device which detects an abnormality of the screen display displayed on the display 1, and includes the screen display data monitoring unit 44 that monitors the screen display data displayed by the display 1, and the screen display freeze detection unit 45 that determines whether or not the screen display has transitioned according to the operation of the passenger based on the screen display data and the operation regarding the screen display performed by the passenger. When the screen display does not transition within a predetermined period from the operation by the passenger regarding the operating device 2, the screen display freeze detection unit 45 determines that the screen display is in the freeze state of being unresponsive to the operation of the passenger.

As an example of a method for determining whether or not an abnormality has occurred in the function of the system, an abnormality detection method using a watchdog timer has been conventionally known. In this abnormality detection method, a signal for monitoring is periodically generated inside the system, and an abnormality detection is performed according to the presence/absence of a response to that signal. However, among failures of the system, there are failures of a type in which even though there is a response to the signal for monitoring and the watchdog timer has been initialized, the process inside the system does not proceed. This type of failure cannot be detected by the abnormality detection method using the watchdog timer. Moreover, this type of failure possibly causes the freeze state of the screen display of the display 1, and there is a problem that the abnormality detection method using the watchdog timer is undesirable as a method for detecting the freeze state of the screen display. In contrast to this, in the abnormality detection device and the abnormality detection method according to the present embodiment, the screen display data itself displayed by the display 1 is used for the determination method of the abnormality detection of the display 1, and therefore the freeze state of the screen display being unresponsive to the operation of the user can be detected.

In addition, in the present embodiment, the abnormality detection device 4 includes the operation data obtaining unit 411 that obtains the operation data corresponding to the operation of the passenger from the operating device 2 that is operable by the passenger, and the operation monitoring unit 412 that monitors the obtained operation data. When the transition of the screen display is determined to be required by the operation of the passenger, the screen display freeze detection unit 45 starts the determination of whether or not the screen display has transitioned. Thus, it is possible to suppress the determination process from being started in a situation where the determination of whether or not the screen display has transitioned is unrequired, and therefore a calculation load of the abnormality detection device 4 can be reduced compared with a case where it is always determined whether or not the screen display has transitioned.

In addition, in present embodiment, the display 1 is mounted on the vehicle, and the user operating the operating device 2 is the passenger of the vehicle. Thus, it is possible to detect the freeze state of the screen display even in a case of a vehicle display on which the freeze state of the screen display has a large effect.

In addition, in the present embodiment, the abnormality detection device 4 includes the application management unit 421 that identifies the screen display related application 3A linked to the operation of the passenger as the target application, and the recovery processing unit 46 that outputs an instruction to restart the target application when the screen display is determined to be in the freeze state. Thus, the recover process for solving the freeze state of the screen display is executed in the target system, and the freeze state of the screen display can be solved. In a situation where the vehicle is travelling, it is considered difficult to execute a process of cutting off electric power supply to the system and then resuming the electric power supply to start the system, that is, to execute a reboot process of the system. Even in such a situation where the reboot process of the system cannot be performed, the abnormality detection device and the abnormality detection method according to the present embodiment can solve the freeze state of the screen display.

In addition, in the present embodiment, the screen display freeze detection unit 45 compares the screen display data of when the operation of the passenger was performed with the screen display data of after the lapse of a predetermined period, and thereby determines whether or not the screen display of the display 1 has transitioned. Since data that allows easily determining whether or not the screen display is in the freeze state is used, the calculation load of the abnormality detection device 4 can be reduced.

In addition, in the present embodiment, the abnormality detection device 4 includes the target region extraction unit 441 that extracts a screen region which is a target of transition according to the operation of the passenger within the screen display of the display 1 as the target region. The screen display freeze detection unit 45 compares the screen display data corresponding to the target region of when the operation of the passenger was performed with the screen display data corresponding to the target region of after the lapse of a predetermined period, and thereby determines whether or not the screen display has transitioned. Thus, the calculation load of the abnormality detection device 4 can be reduced compared with a case where the comparison is made using the screen display data corresponding to the entire screen display.

In addition, in the present embodiment, the display 1 includes the meter display 11 that displays the speedometer of the vehicle, and the operation of the passenger includes the accelerator operation by the driver. The driver performs the accelerator operation in a state of being concentrated more on the driving operation than the display of the speedometer. Thus, even when the operation of the user is not an operation performed with awareness of the display on the display 1, the freeze state of the screen display can be detected.

In addition, in the present embodiment, the display 1 includes the center display which displays the navigation screen of the vehicle, and the operation of the passenger includes the operation of the passenger changing the display of the navigation screen. Even when the screen display has a large effect on the passenger of the vehicle as with the navigation screen, the freeze state of the screen display can be detected.

Second Embodiment

Next, an abnormality detection device according to the second embodiment will be described. The abnormality detection device according to the present embodiment has configurations similar to those of the abnormality detection device 4 according to the first embodiment except for the fact that the function of a recovery processing unit 56 (not illustrated) is different from the function of the recovery processing unit 46 according to the first embodiment. Therefore, for the configurations that are similar to those of the abnormality detection device 4 according to the first embodiment, the description of the first embodiment given using FIG. 1 to FIG. 5 is employed.

The function of the recovery processing unit 56 according to the present embodiment will be described. In the present embodiment, the recovery processing unit 56 executes the process for causing the screen display to recover from the freeze state in phases. First, as a first stage, when the recovery process instruction is input from the screen display freeze detection unit 45, the recovery processing unit 56 outputs a restart instruction to the target system to restart the target application identified by the application management unit 421. The process content in the first stage is the same as the process content executed by the recovery processing unit 46 according to the first embodiment.

The restart instruction from the recovery processing unit 56 causes the target application to restart in the target system, and when the screen display of the display 1 is updated, the recovery processing unit 56 determines whether or not the screen display of the display 1 maintains the freeze state. When the freeze state of the screen display is determined to be maintained, as a second stage, the recovery processing unit 56 outputs a restart instruction to the target system to restart the other applications included in the target system in addition to the target application.

The restart instruction from the recovery processing unit 56 causes every application including the target application to restart in the target system, and when the screen display of the display 1 is updated, the recovery processing unit 56 determines whether or not the display 1 displays a home screen. The home screen is a screen that is first displayed after the display 1 is started. When the display 1 does not display the home screen, as a third stage, the recovery processing unit 56 outputs a restart instruction to the target system to restart the target system.

FIG. 6 is an example of a flowchart illustrating a process executed by the recovery processing unit 56. In Step S51, the recovery processing unit 56 obtains the recovery process instruction from the screen display freeze detection unit 45. The recovery process instruction obtained by the recovery processing unit 56 is the recovery process instruction output from the screen display freeze detection unit 45 in Step S41 of FIG. 5. In Step S52, the recovery processing unit 56 outputs the restart instruction of the target application to the target system. The target application and the target system are the target application and the target system identified by the screen display management unit 42 in Step S12 of FIG. 4, respectively.

In Step S53, after the lapse of a restart period required for restarting the target application after the process of Step S52 has ended, the recovery processing unit 56 determines whether or not the screen display of the display 1 maintains the freeze state. For example, the recovery processing unit 56 compares the CRC data of the screen display data at the point when the screen display was determined to be in the freeze state with the CRC data of the screen display data of after the restart of the target application, and thereby determines whether or not the screen display maintains the freeze state. When a match result is obtained as the comparison result, the recovery processing unit 56 determines that the screen display of the display 1 maintains the freeze state, and when a mismatch result is obtained as the comparison result, the recovery processing unit 56 determines that the screen display of the display 1 does not maintain the freeze state. When a positive determination is made by the recovery processing unit 56, the process proceeds to Step S54, and when a negative determination is made, the recovery processing unit 56 ends the process of the flowchart illustrated in FIG. 6. Note that, in order to reduce the calculation load of the abnormality detection device 4, the comparison process of the CRC data is preferably a process in which a comparison is made using the CRC data of the target region, similarly to the first embodiment.

In Step S54, the recovery processing unit 56 outputs the restart instruction of every application included in the target system to the target system. In Step S55, after the lapse of a restart period required for restarting every application after the process of Step S54 has ended, the recovery processing unit 56 determines whether or not the home screen is displayed on the display 1. For example, the recovery processing unit 56 compares the CRC data of the screen display data of the home screen with the screen display data of after the restart of every application, and thereby determines whether or not the home screen is displayed on the display 1. When a match result is obtained as the comparison result, the recovery processing unit 56 determines that the home screen is displayed on the display 1, and when a mismatch result is obtained as the comparison result, the recovery processing unit 56 determines that the home screen is not displayed on the display 1. When a negative determination is made by the recovery processing unit 56, the process proceeds to Step S56, and when a positive determination is made, the recovery processing unit 56 ends the process of the flowchart illustrated in FIG. 6.

In Step S56, the recovery processing unit 56 outputs the restart instruction of the target system to the target system.

When the process of Step S56 ends, the recovery processing unit 56 ends the process of the flowchart illustrated in FIG. 6.

As described above, in the present embodiment, when the freeze state of the screen display continues after the restart of the target application, the recovery processing unit 56 outputs an instruction to restart every application included in the target system to the target system. Thus, the recover process for solving the freeze state of the screen display is executed in the target system. Even in a case where the freeze state of the screen display cannot be solved by only restarting the target application, the freeze state of the screen display can be solved. Moreover, for example, even in a situation where the screen display related system 3 cannot be restarted, such as in a situation where the vehicle is travelling, the freeze state of the screen display can be solved.

In addition, in the present embodiment, when the home screen is not displayed on the display 1 after the restart of every application included in the target system, the recovery processing unit 56 outputs an instruction to restart the target system to the target system. Thus, the recover process for solving the freeze state of the screen display is executed in the target system, and the freeze state of the screen display can be solved.

Note that the embodiments described above are described for ease of understanding of the present invention and are not described to limit the present invention. Accordingly, each element disclosed in the above-described embodiments is intended to include all design changes and equivalents that fall within the technical scope of the present invention.

The above-described first embodiment has been described by giving an example of a configuration in which the recovery processing unit 46 outputs an instruction to restart the target application when the screen display is determined to be in the freeze state. However, for example, the recovery processing unit 46 may exclude a specific application from the target of restart. For example, the recovery processing unit 46 may execute a process of excluding the application-for-navigation 32A illustrated in FIG. 1 from the target of restart. The application-for-navigation 32A is an application that is not only for providing route guidance to the passenger, but is also related to driving assistance for the driver or autonomous traveling of a vehicle in an autonomous traveling vehicle. This is based on the perspective of suppressing influence on the traveling of the vehicle by excluding the application related to the traveling of the vehicle from the target of restart. Also, based on a similar perspective, the recovery processing unit 46 may execute a process of excluding the application-for-vehicle control 31A illustrated in FIG. 1 from the target of restart. The above-described process of excluding a specific application can also be applied to the recovery processing unit 56 according to the second embodiment.

In addition, for example, when the navigation system 32 includes an application-for-navigation generated by a third person other than a manufacturer of the vehicle, unlike the application-for-navigation 32A, the recovery processing unit 46 may execute a recovery process that is different from the recovery process according to the above-described first embodiment. For example, when the screen display is determined to be in the freeze state, the recovery processing unit 46 may output an instruction to restart the target system instead of the target application to the target system. This is based on the perspective that, since the application-for-navigation manufactured by a third party operates independently from the applications included in the target system, even when the target system is restarted, an influence on the traveling of the vehicle is suppressed. The possibility of solving the freeze state of the screen display can be more enhanced than in the case of restarting the target application, and therefore it is possible to increase the speed of solving the freeze state.

In addition, while the above-described embodiments have been described by giving an example of the accelerator pedal 21 as the operating device 2 that can change the screen display of the meter display 11, the operating device 2 may be a configuration including a brake pedal instead of or together with the accelerator pedal 21. Moreover, while the above-described embodiments have been described by giving an example of the configuration illustrated in FIG. 1 as the display 1, the operating device 2, and the screen display related system 3, the screen display system 100 may have another configuration. For example, the screen display system 100 may include an auxiliary display which is provided on a lower side with respect to the center display 12 and displays information corresponding to the operation of the passenger, such as a set temperature of an air conditioner, as the display 1. In addition, the screen display system 100 may include a button or dial for temperature adjustment for adjusting the set temperature of the air conditioner that is provided around the auxiliary display as the operating device 2 that can change the screen display of the auxiliary display. In addition, the screen display system 100 may include an air conditioning system that includes an application-for-air conditioning as the screen display related system 3.

In addition, while the above-described embodiments have been described by giving an example of the configuration illustrated in FIG. 1 as the operating device 2, the operating device 2 may be constituted of another device. For example, the operating device 2 may include a Time Of Flight (TOF) camera that captures an image of the driver and the other passengers. For example, when the application-for-vehicle control 31A causes the meter display 1 to display a display (such as a warning lamp) corresponding to a posture of the driver based on a captured image captured by the TOF camera, the abnormality detection device and the abnormality detection method according to the present invention can be applied. Moreover, the display 1 is not limited to a display embedded in advance to the instrument panel, and may be an on-dash monitor provided on a top portion of a dashboard. Furthermore, the display 1 may be a display for a rear seat passenger, such as a head rest-type display provided on a head rest of a seat in front or a flip-type display provided on a ceiling of the vehicle.

DESCRIPTION OF REFERENCE NUMERALS

100 Screen display system
  1 Display
  2 Operating device
  3 Screen display related system
    31 Vehicle control system
      31A Application-for-vehicle control
    32 Navigation system
      32A Application-for-navigation
    33 Audio system
      33A Application-for-audio
  4 Abnormality detection device
    41 User operation detection unit
      411 Operation data obtaining unit
      412 Operation monitoring unit
    42 Screen display management unit
      421 Application management unit 422 Screen display data generation unit
43 Screen output unit
44 Screen display data monitoring unit
441 Target region extraction unit
442 CRC calculation unit
45 Screen display freeze detection unit
46 Recovery processing unit

The invention claimed is:

1. An abnormality detection device for detecting an abnormality of a screen display displayed on a display, configured to:
monitor screen display data displayed by the display;
determine, based on the screen display data and a user operation regarding the screen display performed by a user, whether or not the screen display has transitioned according to the user operation,
extract a screen region which is a target of transition by the user operation within the screen display as a target region; compare the screen display data corresponding to the target region of when the user operation was performed with the screen display data corresponding to the target region of after a lapse of a predetermined period from the user operation, so as to determine whether or not the screen display has transitioned;
when the screen display does not transition within the predetermined period, determine that the screen display is in a freeze state of being unresponsive to the user operation,
identify an application linked to the user operation as a target application; and
output an instruction to restart the target application when the screen display is determined to be in the freeze state.

2. The abnormality detection device according to claim 1, configured to:
obtain operation data corresponding to an operation of the user from an operating device which is operable by the user;
monitor the operation data,
when the transition of the screen display is determined to be required by the user operation, start a determination of whether or not the screen display has transitioned.

3. The abnormality detection device according to claim 1, wherein the display is mounted on a vehicle, and
wherein the user is a passenger of the vehicle.

4. The abnormality detection device according to claim 3, configured to:
identify an application linked to the user operation as a target application, and identify a system including the target application as a target system;
execute a recovery process on the freeze state of the screen display when the screen display is determined to be in the freeze state; and
output an instruction to restart the target system as the recovery process,
wherein a navigation system of the vehicle includes a third person application generated by a third person other than a manufacturer of the vehicle.

5. The abnormality detection device according to claim 3, wherein
the display includes a display which displays a vehicle speed meter of the vehicle, and
the user operation includes an accelerator operation or a brake operation by a driver of the vehicle.

6. The abnormality detection device according to claim 3, wherein
the display includes a display which displays a navigation screen of the vehicle, and
the user operation includes an operation of changing a display of the navigation screen performed by the passenger of the vehicle.

7. The abnormality detection device according to claim 1, configured to:
identify a system including the target application as a target system, and
when the freeze state of the screen display continues after the restart of the target application, output an instruction to restart every application included in the target system.

8. The abnormality detection device according to claim 7, configured to:
when a home screen is not displayed on the display after the restart of every application, output an instruction to restart the target system.

9. The abnormality detection device according to claim 1, configured to:
execute a process of excluding an application for navigation of the vehicle from a target to be restarted.

10. An abnormality detection method for detecting an abnormality of a screen display displayed on a display by a controller, comprising:
monitoring screen display data displayed on the display;
determining, based on the screen display data and a user operation regarding the screen display performed by a user, whether or not the screen display has transitioned according to the user operation;
extracting a screen region which is a target of transition by the user operation within the screen display as a target region;
comparing the screen display data corresponding to the target region of when the user operation was performed with the screen display data corresponding to the target region of after a lapse of a predetermined period from the user operation, so as to determine whether or not the screen display has transitioned;
when the screen display does not transition within the predetermined period, determining that the screen display is in a freeze state of being unresponsive to the user operation,
identifying an application linked to the user operation as a target application; and
outputting an instruction to restart the target application when the screen display is determined to be in the freeze state.

* * * * *